Dec. 19, 1933.  E. A. CORBIN, JR  1,939,664
CUSHION WHEEL
Filed Aug. 28, 1931     4 Sheets-Sheet 1

INVENTOR.
ELBERT A. CORBIN, JR.
BY Louis Necho
ATTORNEY.

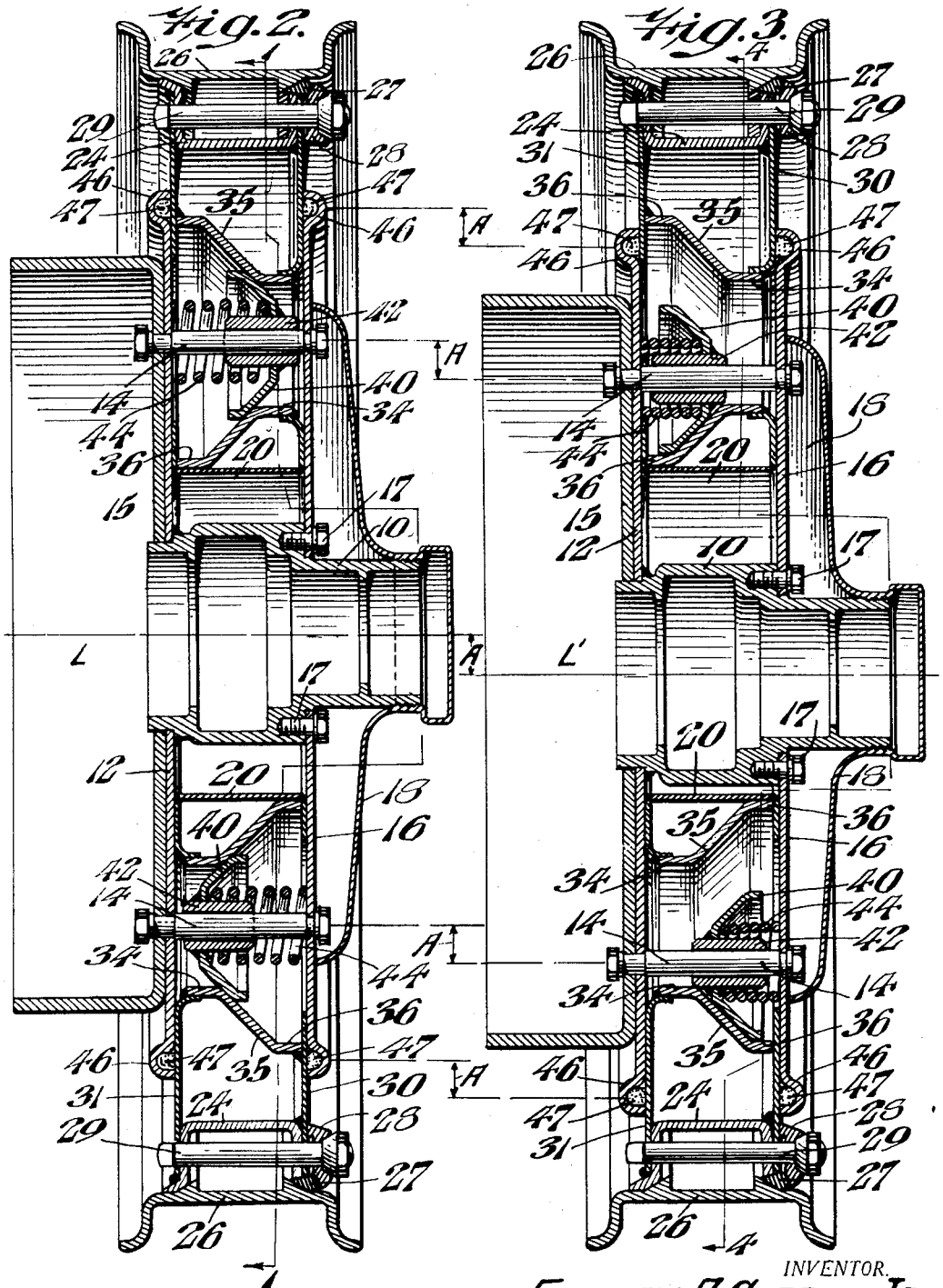

Dec. 19, 1933.  E. A. CORBIN, JR  1,939,664
CUSHION WHEEL
Filed Aug. 28, 1931  4 Sheets-Sheet 3

INVENTOR.
ELBERT A. CORBIN, JR.
BY Louis Necho
ATTORNEY.

Dec. 19, 1933.  E. A. CORBIN, JR  1,939,664
CUSHION WHEEL
Filed Aug. 28, 1931  4 Sheets—Sheet 4

INVENTOR
ELBERT A. CORBIN, JR.
BY Louis Necho
ATTORNEY.

Patented Dec. 19, 1933

1,939,664

UNITED STATES PATENT OFFICE 1,939,664

CUSHION WHEEL

Elbert A. Corbin, Jr., Swathmore, Pa., assignor of one-half to William C. Biddle, Lansdowne, Pa.

Application August 28, 1931. Serial No. 559,833

14 Claims. (Cl. 152—28)

My invention relates to a new and useful cushion wheel which is provided with a resilient transmission or bearing construction for yieldably and effectively rotating the wheel and which is further provided with a plurality of cushioning units adapted to absorb or neutralize vertical and lateral thrust as well as tangential torque.

In my prior Patent No. 1,664,389 of March 27th, 1928, I disclosed and claimed a cushion wheel having a resilient transmission wherein I employed fluted driving rings carried by abutment plates rigidly secured to the hub, said rings being adapted to engage correspondingly fluted members carried by the wheel plates which support the rim, the abutments and wheel plates referred to having a mutual sliding relation which was regulated or controlled by a spring actuated cushioning unit located around the hub of the wheel. The use of the driving rings and fluted members referred to greatly added to the initial cost and the cost of maintenance, and greatly increased the weight of the construction. By my present invention I have produced a novel resilient transmission or bearing, in which no driving rings or their equivalent are employed.

Furthermore, in my prior patent referred to, the single cushioning unit consisted of a spring-tensioned cone and bowl construction centrally located around the hub of the wheel, which cushioning unit had to sustain and neutralize the entire vertical and lateral thrust which may be exerted on the wheel or any part thereof, thereby eliminating the necessity of building of said cushioning unit of heavy sections made of the best metals and having the highest coefficients of tensile strength, thereby greatly increasing the cost and lowering the index of efficiency. By my present invention, I utilize a plurality of cushioning devices, distributed within the wheel, which not only serve as resilient driving transmissions or bearings, but which also serve to absorb and neutralize the vertical and lateral thrust and the tangential torque to which the wheel may be subjected, and whereby the thrust or torque exerted on the wheel, or any part thereof, is evenly distributed over a relatively large number of yielding contact points, so that I am enabled to build said cushioning units of smaller sections and of less expensive material, thereby rendering my device commercially practicable.

By further referring to my prior patent aforesaid, it will be seen that the single cushioning unit therein employed was adapted to neutralize lateral thrust in one direction only, thereby resulting in an imperfectly balanced condition of the wheel in action, and in order to remedy this defect, I have by my present invention arranged the plurality of cushioning units employed in oppositely alternating fashion, so as to neutralize lateral thrust in opposite directions thereby producing a perfectly balanced effect.

With the above and other objects in view, my present invention consists of a wheel having a hub, abutment plates carried by said hub, wheel plates for supporting the rim of the wheel, said wheel plates and abutment plates being in mutual sliding relation to each other, and a plurality of oppositely and alternately disposed combined driving and cushioning units carried by said abutments and adapted to bear against said wheel plates, to produce resilient bearings or transmission points for yieldably driving the wheel, and at the same time to serve as cushioning devices to yield under the stress of vertical and lateral thrust as well as tangential torque in all directions in an even and uniform manner, thereby eliminating shock, jar and rebound.

My invention still further relates to various other novel features of construction and advantage, all as hereinafter described and claimed in connection with the accompanying drawings, in which:

Figure 2 represents a section on line 2—2 of Figure 1.

Figure 3 represents a view similar to Figure 2 showing the parts in the position they assume when the wheel is subjected to torque or stress.

Figure 1:
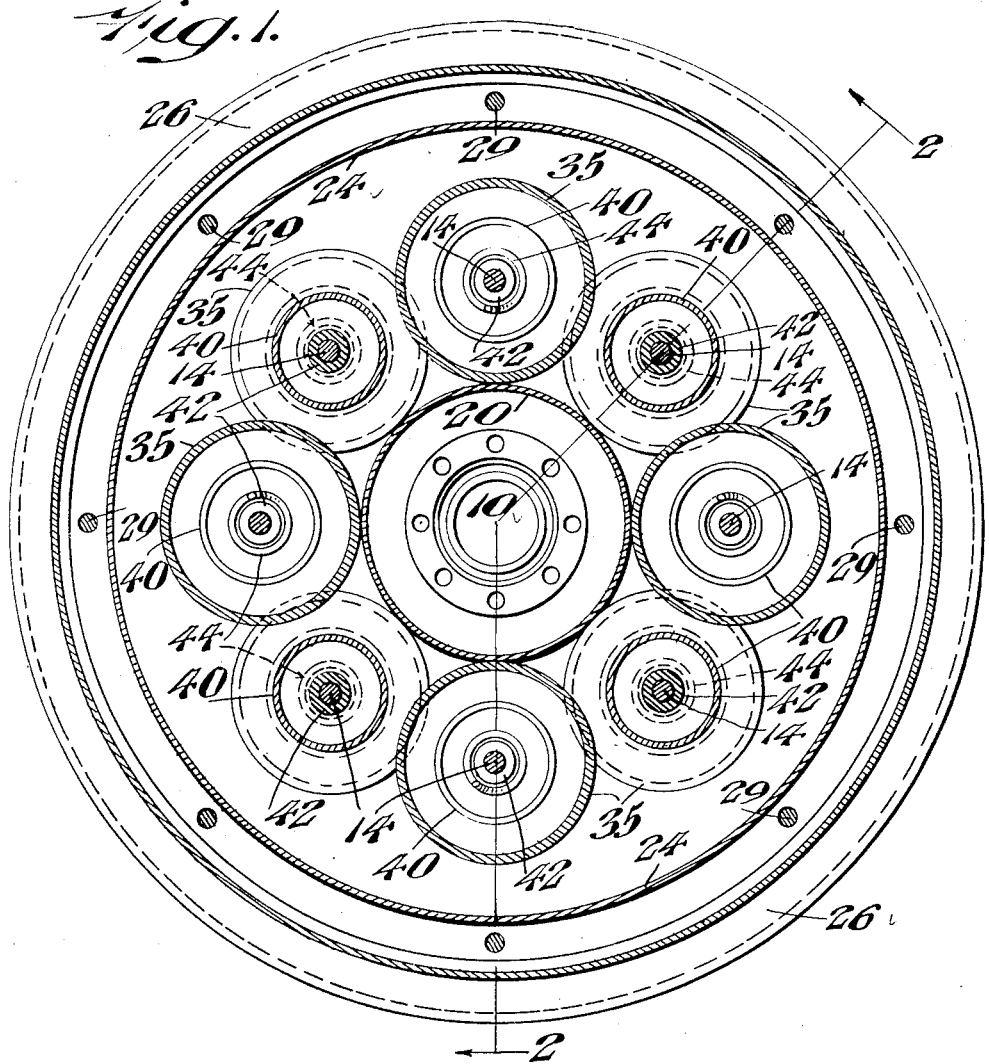
Figure 1 represents a view partly in elevation and partly in section of a cushion wheel embodying my invention, the view being taken along line 1—1 of Figure 2, and the parts being shown in their normal position before the wheel is subjected to any stress.
Figure 4:
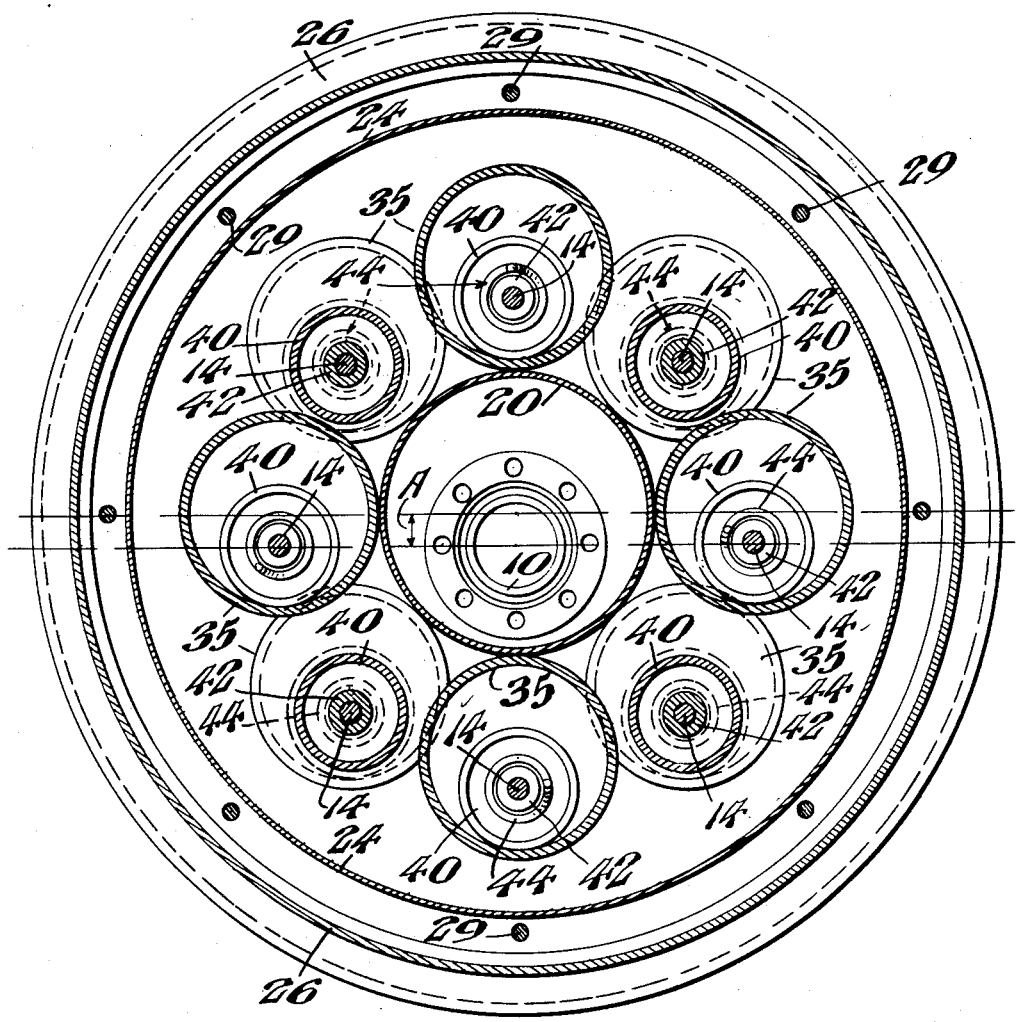
Figure 4 represents a view partly in section and partly in elevation, the view being taken on line 4—4 of Figure 3.

For the purpose of illustrating my invention I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings, in which like reference characters designate like parts, 10 designates the hub of a wheel which is of any suitable construction to receive the axle (not shown). To the inner portion of the hub 10 is secured, by welding or otherwise, the in-bound abutment plate 12, to which is secured by means of the bolts 14 the conventional brake drum 15. To the outer portion of the hub 10 is secured the complementary out-board abutment 16 by means of the bolts 17. 18 designates a suitable hub cap which may be threadedly or otherwise secured to the outer end of the hub and which may be of the size shown by Figure 2, so as to cover and protect the bolts 14 and 17 and intermediate parts. The central portion of the hub 10 is surrounded by the annular casing 20 which is secured in position in the manner hereinafter described. 24 designates the felloe of the wheel which carries the detachable rim 26 which is secured in position by the split ring 27 which is retained by the lugs 28 engaged by the bolts 29. To the felloe band 24 is welded, or otherwise secured, the out-board and in-board wheel plates 30 and 31. The wheel plate 31 is welded, or otherwise secured to the juxtaposed areas of the cylindrical part 34 of the conical bowl-shaped member 35 which terminates in the cylindrical skirt portion 36 which is welded to the out-board wheel plate 30. The inner edge of the out-board wheel plate 30 is welded to the juxta-posed edge of the annular casing 20 hereinbefore referred to. Within the bowl-shaped member 35 is adapted to slide the conical member 40 which is welded at its reduced end to the sleeve 42 which is adapted to slide along the bolt 14, the conical shaped member 40 being retained in the normal concentric position shown in Figure 2 by the spring 44. The conical member 40 may be made integral with the sleeve 42. The inboard abutment 12 and the out-board abutment 16 are provided with the annular beads 46 which enclose suitable gaskets 47 to prevent the escape of the lubricant employed to lubricate the parts in and around the bowl-shaped members 35.

The operation is as follows: When the hub 10 and the axle (not shown) are subjected to a sudden vertical thrust, whether due to a sudden increment of load or to bumps or obstructions in the road-bed, the axle experiences a downward thrust in the direction of the arrow A, thereby exerting a relative downward push on the abutments 12 and 16. The tendency of the abutments 12 and 16 to slide along the outer surface of the wheel plates 30 and 31, results in forcing the inner smaller conical member 40 to slide against the juxtaposed conical portion of the outer bowl-shaped member 35, against the tension of the spring 44 which tends to prevent or retard the sliding of the conical member 40 thereagainst. Therefore, as the center of the hub 10 is relatively depressed from the line L to the line L', the conical member 40 is forced to slide from the position shown in Figure 2 to the position shown in Figure 3 wherein it abuts against the cylindrical outer portion 36 of the bowl-shaped member 35 and thus compresses the spring 44. The beads 46 containing the gaskets 47 now occupy an equally lower position, which is also illustrated in Figure 3. The tensioning devices, only one of which has thus far been described, are identical in their construction and are distributed in circular formation around the hub of the wheel, as will be seen from Figure 1. Furthermore, in order to counterbalance any lateral thrust to which the wheel or parts thereof may be subjected, I arrange the cushioning devices in an inversely alternating manner, so that one of said cushioning devices is tensioned in one direction and the next succeeding cushioning device is tensioned in the opposite direction, all of which is very clearly shown in all of the figures of the drawings and more particularly in Figures 2 and 3.

The extreme opposite positions of the parts shown in Figures 1 and 2 and 3 and 4, respectively, namely, the position of complete rest and the position of complete compression, illustrate the resultant positions due to vertical thrust only. My construction however lends itself equally well for the absorption of braking torque, such as takes place due to a sudden stop of a vehicle travelling at high speed, and the position the parts will assume under that condition is clearly illustrated in Figure 5 wherein the centers of the bowl-shaped members 35, which coincide with the centers of the supporting bolts 14, are moved from their initial concentric positions in a circular progression in the direction of travel of the vehicle, the tension of the spring 44 therein absorbing the braking torque, thereby protecting the parts of the wheel or of the vehicle from the violent jar which is normally experienced upon a sudden application of brakes to the wheels of a fast moving vehicle.

From the foregoing description, it will be seen that my novel cushion wheel is provided with what may be termed as "indirect suspension" as opposed to structures employing "direct suspension", such as the conventional constructions in automobiles wherein the vertical thrust is exerted directly on the spring under the vehicle thus necessitating the use of shock absorbers or rebound dampeners to supplement the shock absorbing capacity of the springs. It will be seen that in my construction the thrust, whether vertical or tangential, is not exerted directly on the springs 44 but is exerted on the abutment plates 12 and 16 which when sliding along the wheel plates 30 and 31 force the conical members 40 to slide against the conical members 35, thus only indirectly compressing the springs 44.

A further distinct advantage of my present construction is that by providing a plurality of cushioning units I distribute the total thrust received over a large number of contacting points (40, 42, 35) and resilient devices (44), thus reducing the specific pressures exerted on any one unit, whereas if only one tensioning unit is used, which is to be subjected to the entire thrust received, it would be necessary to use units made of heavier sections, which would have to be made of very fine materials having high tensile coefficients, all of which involves considerable expense, thereby making the article impractical from a commercial point of view. By my present construction I am enabled to use commercial products of standard weights and of standard tensile strength, without any danger of breaking down.

Figure 5:
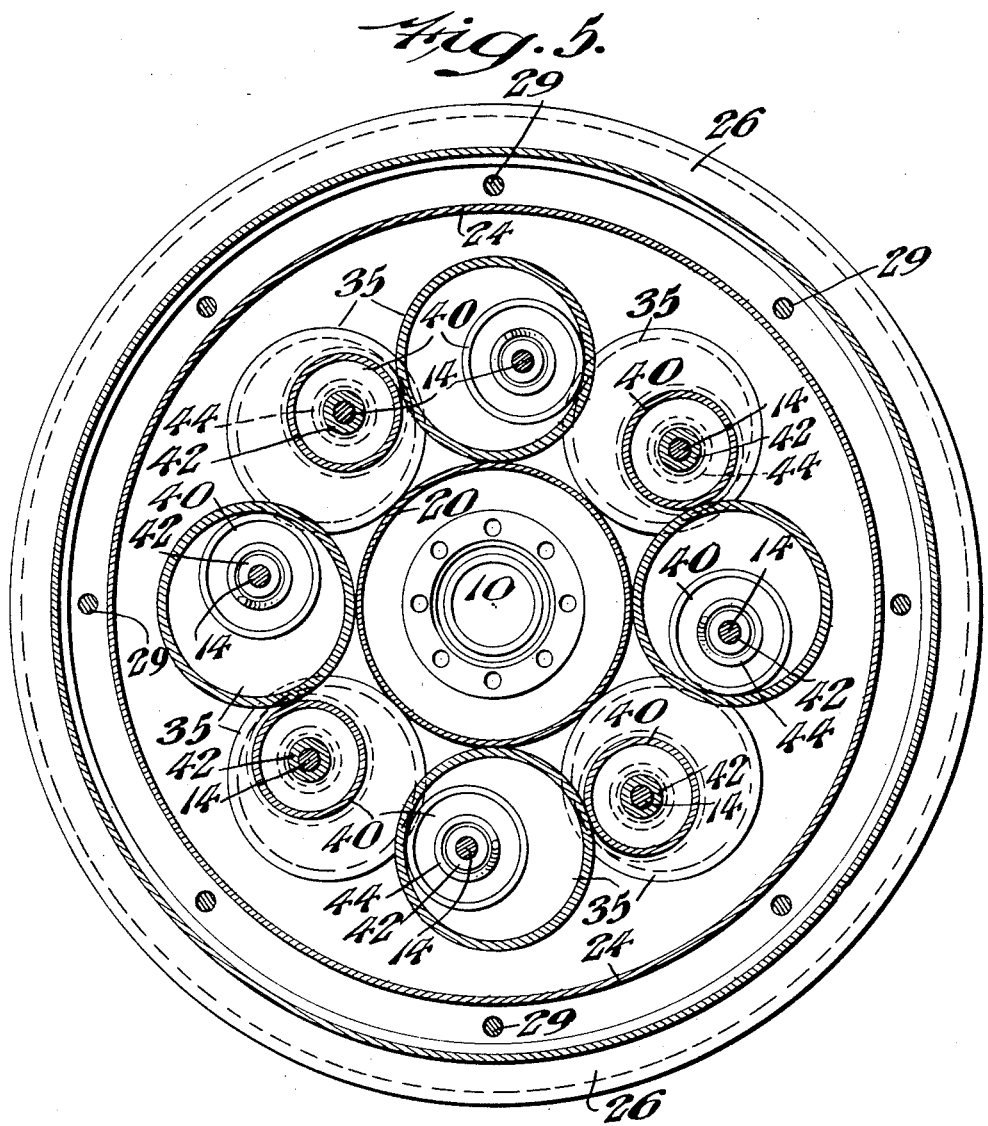
Figure 5 represents a view similar to Figures 1 and 4 showing the position the parts will assume when the wheel has been subjected to tangential torque, resulting from sudden stopping of a vehicle travelling at high speed.

Referring to Figure 5, wherein I have illustrated the eccentric positions which are occupied by the plurality of tensioning units when the vehicle is stopped suddenly, I wish to point out that my novel arrangement serves another important function, in that it provides a torque cushion when the vehicle equipped with a wheel embodying my invention is being started so as to eliminate the jerky starting of the vehicle, since the first torque applied to the wheel, to overcome the inertia of the vehicle, is partly absorbed by the gradual displacing of the tensioning units, thus resulting in a smooth starting of the vehicle. Similarly, the several tensioning units employed act as a rebound dampener after a sudden stopping of a fast travelling vehicle, which sometimes produce a secondary thrust or impact which will be absorbed by the tensioning units which are now displaced in a direction opposite to that shown in Figure 5. This results in a smooth stopping of the vehicle even though such vehicle may be stopped at a relatively high speed.

While in describing this invention, I have described only the lower portion of Figure 2, and while the construction in the upper portion of Figure 2 is the exact reverse of that shown in the lower portion of Figure 2, I have deemed it expedient not to utilize separate reference numerals and not to duplicate the description, all of which I did in the interests of brevity and simplicity.

The resilient transmission character of my construction will be clearly understood by reference to Figure 2 or 3 wherein it will be seen that the conical members 40 are at all times in tensioned contact with outer bowl shaped members which are rigidly secured to the wheel plates 30 and 31 which carry the rim 26. Thus when the hub 10 is revolved, it revolves the abutment plates 12 and 16 through which extends the bolts 14 which carry the conical members 40 which in turn contact with the bowl shaped members referred to under tension of the springs 44 to transmit the rotary motion of the hub to the rim. The action which takes place as a result of acceleration of the vehicle is the exact opposite from that which takes place upon deceleration and the cushioning units are displaced or rendered relatively eccentric in a direction opposite to that shown in Figure 5. Due to this resilient or yielding torque construction, the opening of the throttle of the engine will accelerate the speed smoothly and no forward jerk is experienced due to the suddenly increased pull of the engine, as for instance is the common experience in driving conventional automobiles wherein the sudden opening of the throttle results in a forward jerk due to the sudden increase in speed of the vehicle.

I claim:

1. A flexible, resiliently driven wheel comprising a hub, abutment plates carried thereby, wheel plates having sliding relation to said abutment plates, a fixed horizontal support carried by said abutment plates, a tensioned cam member slidable on said support substantially the entire length thereof, and a second cam member carried by said wheel plates and slidable against said first mentioned cam member.

2. A flexible, resiliently driven wheel comprising a hub, abutment plates carried thereby, wheel plates having vertical sliding relation to said abutment plates, an outer generally conical member carried by said wheel plates, a fixed horizontal support carried by said abutment plates, an inner generally conical tensioned member horizontally slidable on said support, substantially the entire length thereof, and normally concentric with said outer member, said outer and inner members being arranged for yielding wiping action to absorb any thrust, torque or strain to which said wheel may be subjected.

3. A flexible, resiliently driven wheel comprising a hub, abutment plates carried thereby, wheel plates having sliding relation to said abutment plates, a plurality of fixed horizontal supports carried by said abutment plates in circular formation about said hub, tensioned cam members slidable on said supports substantially the entire length thereof, and a plurality of corresponding cam members carried by said wheel plates and slidable vertically against said first mentioned cam members.

4. A flexible, resiliently driven wheel comprising a hub, abutment plates carried thereby, wheel plates having sliding relation to said abutment plates, a plurality of fixed horizontal supports carried by said abutment plates, a plurality of tensioned inner conical members slidable on said supports, substantially the entire length thereof, said tensioned cam members being arranged for yielding action in alternately opposed order, and a corresponding plurality of outer conical members carried by said wheel plates and slidable vertically against said inner, conical members.

5. A flexible, resiliently driven wheel comprising a hub, abutment plates carried thereby, wheel plates having vertical sliding relation to said abutment plates, a plurality of outer generally conical members carried by said wheel plates in circular formation around said hub, a corresponding plurality of fixed horizontal supports carried by said abutment plates, and a plurality of inner generally conical tensioned members slidable on said supports, substantially the entire length thereof and normally concentric with said outer members, said outer and inner members being arranged for wiping action to absorb any thrust, torque or strain exerted upon said wheel.

6. A flexible, resiliently driven wheel comprising a hub, abutment plates carried thereby, wheel plates having sliding relation to said abutment plates, a fixed horizontal support carried by said abutment plates, an inner tensioned, conical member slidable on said support, an outer, conical member carried by said wheel plates and slidable against said first mentioned conical member, and means for limiting the sliding action of said conical members comprising rectilinear, concentric skirts formed at the bases of said conical members.

7. A flexible, resiliently driven wheel comprising a hub, abutment plates carried thereby, wheel plates having vertical sliding relation to said abutment plates, an outer generally conical member carried by said wheel plates, a fixed horizontal support carried by said abutment plates, an inner generally conical tensioned member horizontally slidable on said support and normally concentric with said outer member, said outer and inner members being arranged for yielding wiping action to absorb any thrust, torque or strain to which said wheel may be subjected, and means for limiting the wiping action of said inner and outer conical members comprising rectilinear concentric skirts formed at the bases of said conical members.

8. A flexible, resiliently driven, cushioned wheel comprising a hub, abutment plates carried thereby, fixed bolts passing through said abutment plates, wheel plates adapted to support the rim of said wheel and having sliding relation to said abutment plates, and a plurality of combined resilient transmissions and cushioning devices for yieldably transmitting the rotary motion of said hub to said rim and for absorbing lateral thrust and radial torque to which the wheel may be subjected, said combined resilient transmissions and cushioning devices comprising inner tensioned, vertically fixed conical members horizontally slidable on said bolts and outer horizontally fixed and vertically movable conical members carried by said wheel plates in normally concentric relation to said inner conical members, said conical members being adapted for yielding, tensioned, wiping action when the axle of said wheel is subjected to radial torque, lateral thrust or vertical displacement.

9. A flexible, resiliently driven, cushioned wheel comprising a hub, abutment plates carried thereby, fixed bolts passing through said abutment plates, wheel plates adapted to support the rim of said wheel and having sliding relation to said abutment plates, a plurality of combined resilient transmissions and cushioning devices for yieldably transmitting the rotary motion of said hub to said rim and for absorbing lateral thrust and radial torque to which the wheel may be subjected, said combined resilient transmissions and cushioning devices comprising inner tensioned, vertically fixed conical members horizontally slidable on said bolts, substantially the entire length thereof, and outer horizontally fixed and vertically movable conical members carried by said wheel plates in normally concentric relation to said inner conical members, said conical members being adapted for yielding, tensioned, wiping action when the axle of said wheel is subjected to radial torque, lateral thrust or vertical displacement, and means for limiting the movements of said inner and outer conical members.

10. A flexible, resiliently driven wheel comprising a hub, abutment plates carried thereby, fixed bolts passing through said abutment plates, wheel plates adapted to support the rim of the wheel and having sliding relation to said abutment plates, and a plurality of resilient transmissions intermediate said abutment plates and said wheel plates for yieldably transmitting the rotary motion of said hub to said rim, comprising outer vertically slidable conical members and inner horizontally slidable tensioned conical members sliding on said bolt, substantially the entire length thereof, and coacting with said outer conical members, said resilient transmissions being constructed in an oppositely alternating order around said hub whereby a counterbalanced effect is produced.

11. The combination with a wheel comprising a hub and a rim, abutment plates carried by said hub, a bolt passing through said abutment plates, and wheel plates carried by said rim in sliding relation to said abutment plates, of a plurality of yielding driving devices, comprising outer conical members carried by said wheel plates and inner tensioned conical members slidable on said bolts, substantially the entire length thereof, and coacting with said outer conical members, normally to counteract the tendency of said abutment plates to slide upon said wheel plates, said yielding devices being arranged in circular formation and being adapted for yielding in oppositely alternating directions to produce a counterbalanced action.

12. A flexible, resiliently driven wheel, comprising a hub, abutment plates carried thereby, wheel plates having sliding relation to said abutment plates, a fixed horizontal support carried by said abutment plates, a relatively small inner tensioned conical member slidable on said support, and a relatively large outer conical member carried by said wheel plates in normally concentric relation with respect to said inner tensioned conical member and adapted for wiping action thereagainst, the base portion of said inner conical member being slightly larger than the apex portion of said outer conical member.

13. A flexible, resiliently driven wheel, comprising a hub, abutment plates carried thereby, wheel plates having sliding relation to said abutment plates, a horizontal support carried by said abutment plates, an inner conical member slidable on said support, an outer conical member carried by said wheel plates for wiping action against said inner conical member, and tensioning means acting on said inner conical member normally to retain the base of said inner conical member in tensioned abutment against the apex portion of said outer conical member.

14. A flexible, resiliently driven wheel, comprising a hub, abutment plates carried thereby, wheel plates having sliding relation to said abutment plates, a horizontal support carried by said abutment plates, an inner conical member slidable on said support, an outer conical member carried by said wheel plates for wiping action against said inner conical member, tensioning means acting on said inner conical member normally to retain the base of said inner conical member in tensioned abutment against the apex portion of said outer conical member, and rectilinear, concentric skirts formed on the bases of said conical member for limiting the wiping action of said conical members to prevent the exertion of undue strain on said tensioning device.

ELBERT A. CORBIN, JR.